United States Patent
Wassenhoven

[11] Patent Number: 6,101,805
[45] Date of Patent: Aug. 15, 2000

[54] OPENING ROLLER FOR AN OPEN-END SPINNING DEVICE

[75] Inventor: Heinz-Georg Wassenhoven, Mönchengladbach, Germany

[73] Assignee: W. Schlafhorst AG & Co., Moenchengladbach, Germany

[21] Appl. No.: 09/162,971

[22] Filed: Sep. 29, 1998

[30] Foreign Application Priority Data

Oct. 2, 1997 [DE] Germany ............. 19743745

[51] Int. Cl.$^7$ ............. D01H 4/00
[52] U.S. Cl. ............. 57/408; 19/98; 19/112; 19/114; 57/411
[58] Field of Search ............. 57/404, 406, 408, 57/413, 411, 301, 304; 19/98, 112, 114

[56] References Cited

U.S. PATENT DOCUMENTS

| | | | |
|---|---|---|---|
| 3,720,504 | 3/1973 | Frehn | 29/182.7 |
| 4,287,643 | 9/1981 | Leifeld | 19/114 |
| 4,342,137 | 8/1982 | Ennis et al. | 19/112 |
| 4,352,224 | 10/1982 | Grimshaw et al. | 57/408 |
| 4,805,395 | 2/1989 | Stahlecker et al. | 19/114 |
| 5,709,074 | 1/1998 | Stahlecker | 19/112 |

FOREIGN PATENT DOCUMENTS

| | | |
|---|---|---|
| 24 33 769 A1 | 1/1976 | Germany. |
| 29 04 841 A1 | 8/1980 | Germany. |
| 38 36 833 A1 | 4/1990 | Germany. |
| 38 38 561 A1 | 5/1990 | Germany. |
| 43 42 148 A1 | 6/1995 | Germany. |
| 35 15 153 C2 | 7/1996 | Germany. |
| 196 01 036 A1 | 7/1997 | Germany. |
| 60-99017 | 6/1985 | Japan ............. 19/114 |
| 61-12922 | 1/1986 | Japan ............. 19/114 |
| 61-34233 | 2/1986 | Japan ............. 19/114 |
| 62-104929 | 5/1987 | Japan. |

OTHER PUBLICATIONS

Hartstoffschichten fur Auflosewalzan von Rotor–Spinnmaschinen und deren Einfluss auf Garnqualitat und Lebensdauer Author: Dip.–Ing. karl–Heinz Schmolke, Neubulach, (Apr. 1991).

Entwicklung keramischer Hochleistungswerstoffe Authors: F. Aldinger and W.D.G. Bocker, 1992 No Month Available.

*Primary Examiner*—William Stryjewksi
*Attorney, Agent, or Firm*—Kennedy Covington Lobdell & Hickman, LLP

[57] ABSTRACT

An opening roller (1) for an open-end spinning device with a rotatably seated cylindrical roller body (7) is encircled by a sawtooth card clothing, (10, 10") molded in the form of a helical coil spring essentially entirely of a commercial ceramic material, e.g., aluminum oxide, zirconium oxide, silicon carbide, silicon nitride, or a mixture thereof. The ceramic helical sawtooth card clothing may be directly positioned on the cylindrical roller body by the use of an interlocking base body of the card clothing or by friction fitting a square cross-sectional base body or the ceramic card clothing may be indirectly positioned on the cylindrical roller body by winding the helical card clothing around a support structure that surrounds the cylindrical roller body.

15 Claims, 3 Drawing Sheets

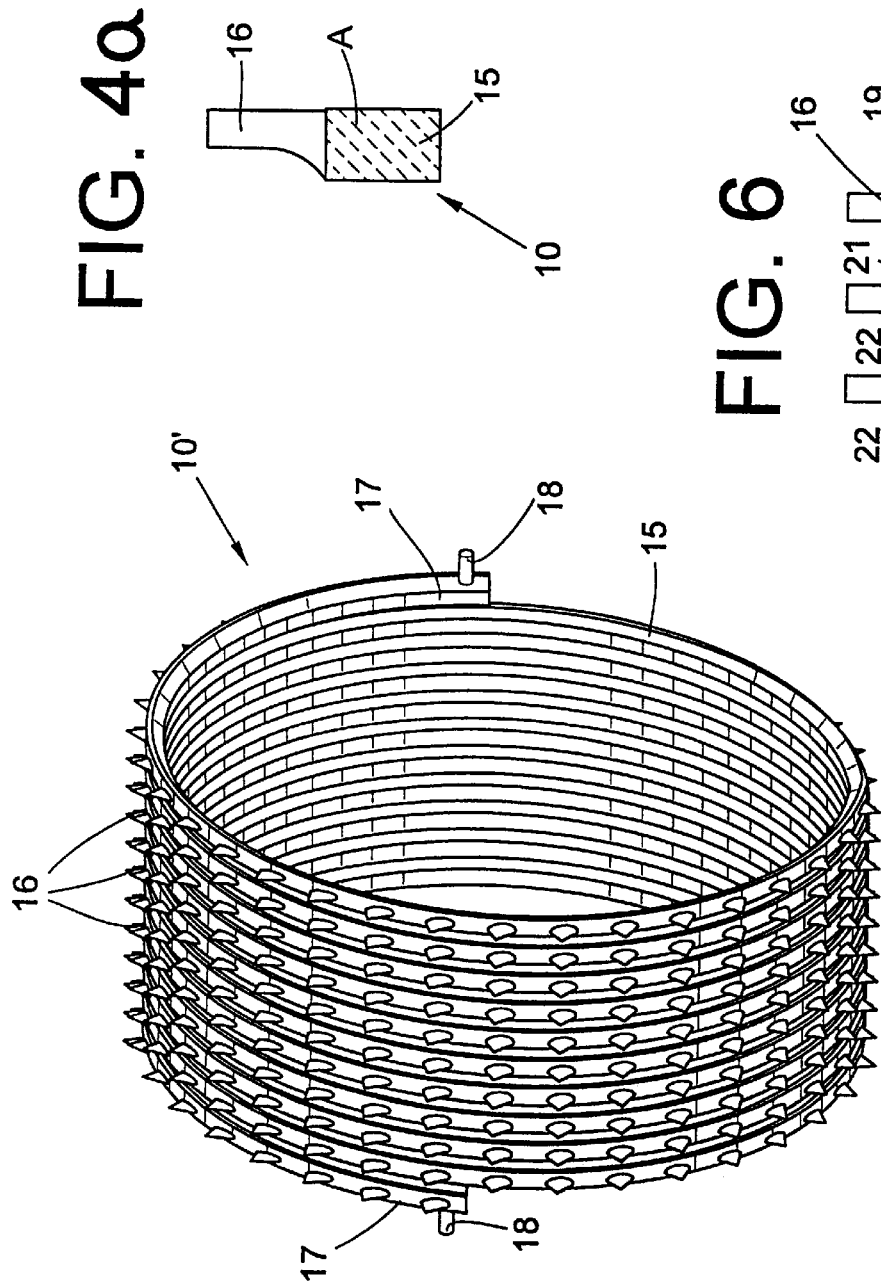

OPENING ROLLER FOR AN OPEN-END SPINNING DEVICE

FIELD OF THE INVENTION

The present invention relates to an opening roller for an open-end spinning device, having a rotatably seated cylindrical roller body which is encircled by sawtooth card clothing.

BACKGROUND OF THE INVENTION

Sliver opening devices in the form of opening rollers have been known for a long time in connection with open-end spinning devices. The rotatably seated opening rollers have a sawtooth card clothing which encircles a cylindrical roller body and which can be produced in accordance with diverse manufacturing processes.

For example, a sawtooth card clothing for an opening roller is known from German Patent Publication DE 35 15 153 C2, formed as a one-piece ring wherein a helically extending groove is initially cut into a bushing-like component of hardenable steel and subsequently a plurality of cuts are machined into the bushing-like component parallel with the center longitudinal axis of the component. Several rows of teeth, which are arranged next to each other and have willowing teeth, are created in this way. Thereafter the sawtooth card clothing is hardened at least in the area of the tips of the teeth.

In a further manufacturing method, a sawtooth wire is wrapped around the cylindrical roller body of the opening roller. The respective ends of the sawtooth wire are then fastened on the roller body. With these opening rollers, known for example from German Patent Publication DE 29 04 841 A1, at least the sawtooth tips are also hardened.

A similarly designed opening roller is described in German Patent Publication DE 24 33 769 A1. This known opening roller has a sawtooth card clothing made of a wire body which is preformed in the manner of a helical spring. The preformed wire body is pushed on the cylindrical roller body and fixed in place thereon.

It has been possible over the course of time to increase the service life of the saw tooth clothing by improving the steel quality and therefore to clearly increase the degree of effectiveness of the opening rollers. However, since the willowing teeth of these devices, which rotate at a relatively high speed, are subject to considerable wear, the service life which can be achieved remains capable of being improved.

An opening roller is described in German Patent Publication DE 196 01 036 A1, wherein the ring of the card clothing is a component formed as a one-piece replacement ring. According to this publication, both the card clothing ring and the replacement ring consist of a high-quality and therefore expensive ceramic material. It is particularly disadvantageous in such a design that, when the clothing set ring is worn or damaged, the entire expensive replacement must be exchanged.

SUMMARY OF THE INVENTION

In view of the above mentioned prior art, it is an object of the present invention to further improve the known opening rollers.

In accordance with the invention, this object is attained by providing an opening roller for an open-end spinning device which comprises a rotatably seated cylindrical roller body encircled by a sawtooth card clothing, wherein the sawtooth card clothing comprises a ceramic material formed in a helical spring-like shape.

An opening roller with a sawtooth card clothing made of a commercially available ceramic material offers the advantages of having an extremely long service life and also being capable of being manufactured in a cost-effective way with relatively little use of material, for example in accordance with an injection molding or transfer molding process.

The ceramic sawtooth card clothing may be directly or indirectly positioned on the rotatable roller body of the opening roller and, if necessary, can be removed without problems and replaced by a new sawtooth card clothing.

By way of example, the card clothing may preferably be formed of an oxide, carbide or nitride as the ceramic material. Aluminum oxide is distinguished by very great hardness, while silicon carbide, for example, has a relatively large flexural strength. It can be additionally advantageous to mix several ceramic materials and to unite in this mainer the positive properties of different ceramic materials in one component. For example, a commercial mixed ceramic material which contains zirconium oxide in addition to aluminum oxide not only has great wear resistance but also relatively good flexural strength.

In an advantageous embodiment, the sawtooth card clothing has a spirally extending base body which is squared in cross-section with willowing elements projecting radially from this base body. A sawtooth card clothing designed in such a way can, for example, be directly pushed onto a smooth roller body and fixed in place thereon between flanges at the ends of the roller body. To prevent the opposite end of the sawtooth card clothing on the opening roller from being bent open by the centrifugal force under rotation at high speed, arresting shoulders are provided at the opposite ends of the sawtooth card clothing which project in the axial direction and engage corresponding bores or recesses in the ends of the flanges of the roller body. In this manner, the arresting shoulders prevent the end areas of the sawtooth card clothing from being bent open.

In another preferred embodiment, the sawtooth card clothing is positioned on a support element having a spirally extending groove on its outer circumference in which the base body of the sawtooth card clothing can be fixed in place. Such fixation of the sawtooth card clothing is accomplished in the manner of being "screwed" into the groove of the support element either frictionally or interlockingly. With an interlocking fastening, a recess is provided in the area of the base body of the sawtooth card clothing, as indicated above. The relatively softer support element, which preferably is made of aluminum, is pressed into this recess in a special rolling process, so that an interlocking connection is created.

Further features, aspects and details of the invention will be recognized and understood from an exemplary embodiment described below with reference to the accompanying drawings.

BRIEF DESCRIPTION OF THE DRAWINGS

FIG. 3 is a perspective view of a sawtooth card clothing, FIG. 4a is a cross-section through the base body of a sawtooth card clothing, wherein the base body is designed for frictional fixation on the cylindrical roller body, FIG. 4b is a cross-section through the base body of a sawtooth card clothing, whose base body is designed for interlocking fixation on the cylindrical roller body, FIG. 5 is a cross-section through the base body of the sawtooth card clothing in accordance with the embodiment of FIG. 2, and FIG. 6 is a cross-section through the support element of the cylindrical roller body depicting the interlocking fixation of a sawtooth card clothing in accordance with FIG. 1 on at a larger scale.

DETAILED DESCRIPTION OF THE PREFERRED EMBODIMENTS

Figure 1:
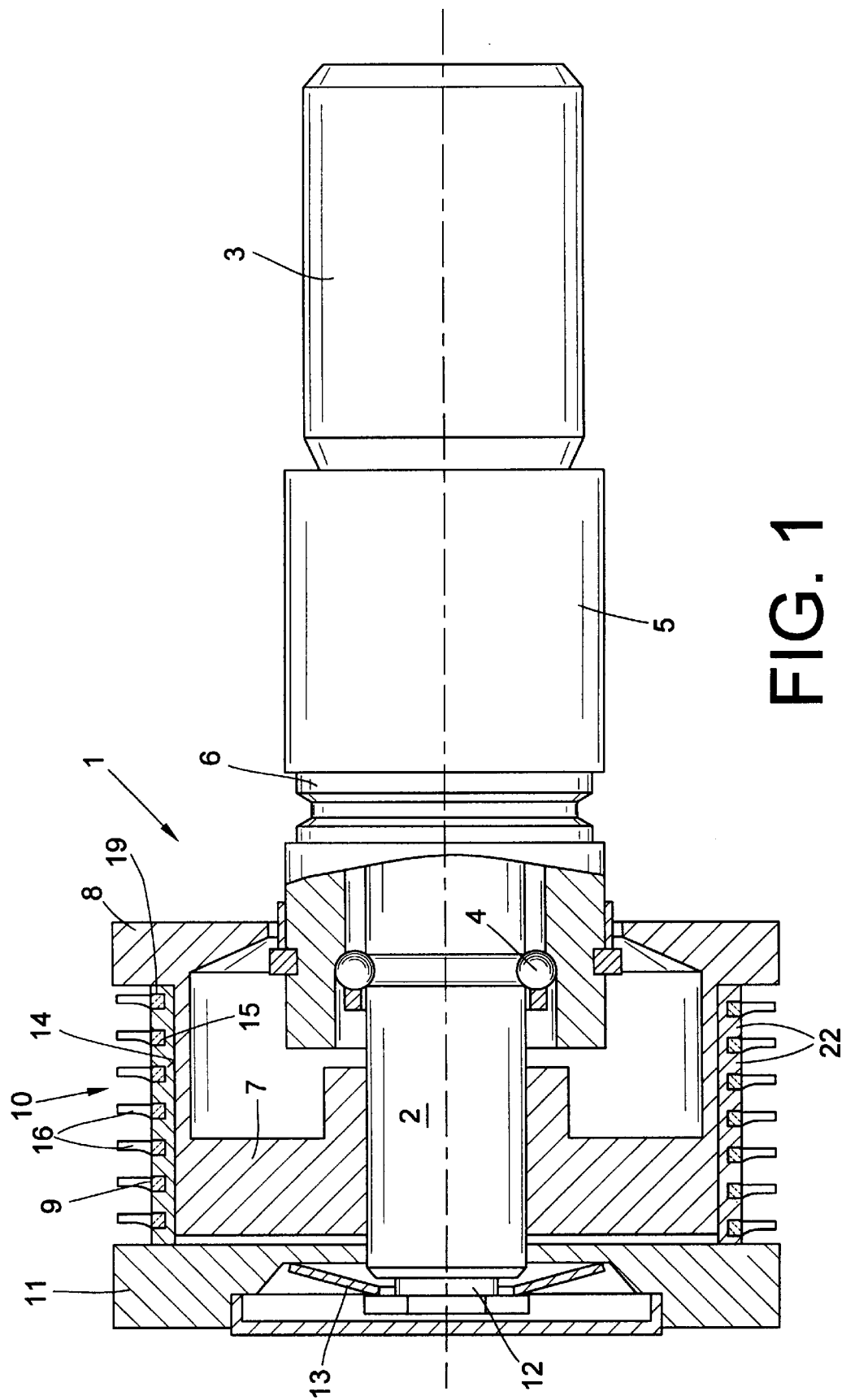
FIG. 1 is a side elevational view, partially in axial cross-section, of an opening roller with a rotatably seated cylindrical roller body provided with a first embodiment of a sawtooth card clothing in accordance with the present invention, which card clothing is designed in a helical manner and composed of a ceramic material.
Figure 2:
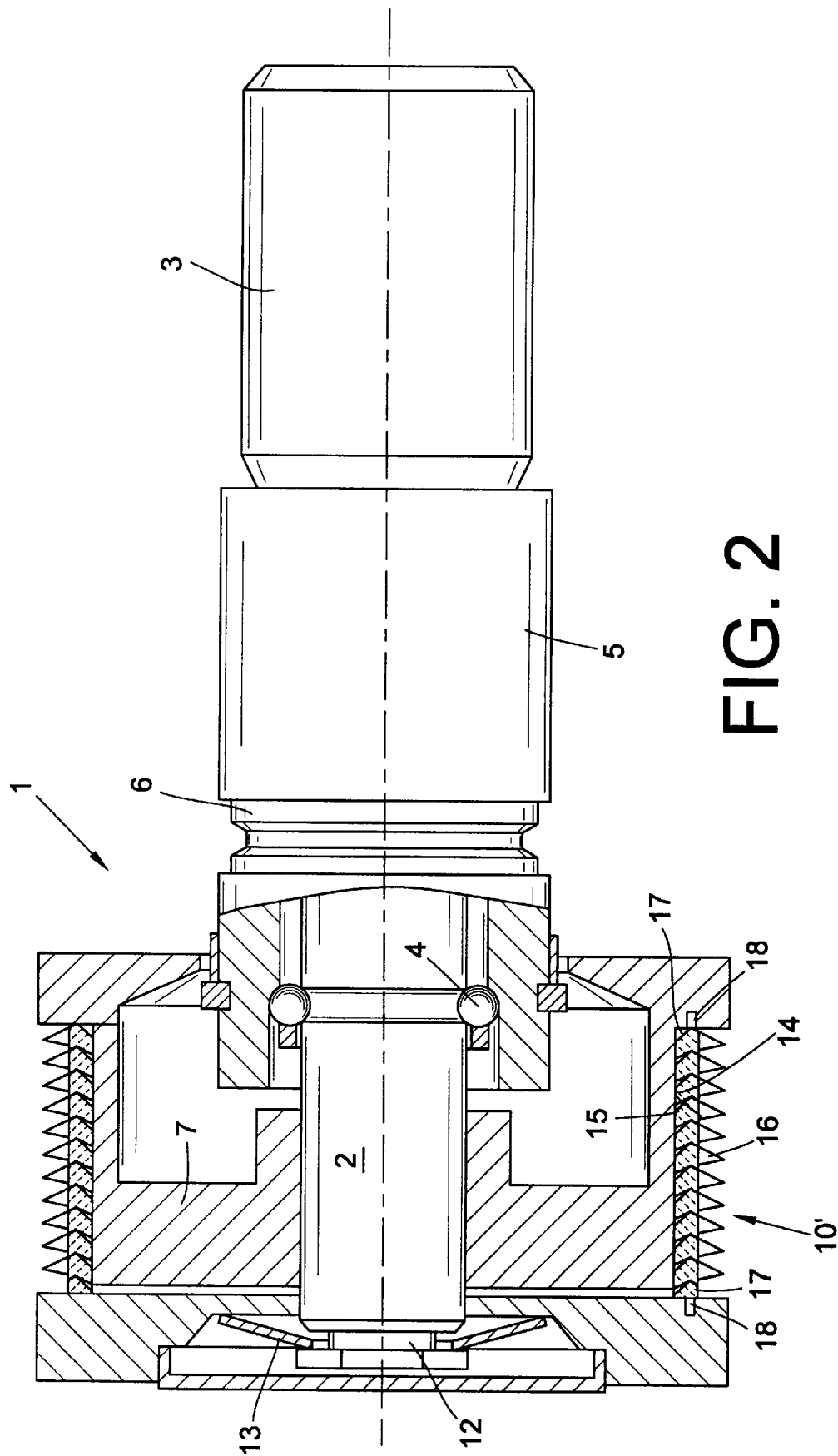
FIG. 2 is another side elevational view, partially in axial cross-section, similar to FIG. 1 depicting an opening roller with a rotatably seated cylindrical roller body provided with a second embodiment of a sawtooth card clothing in accordance with the present invention.

Referring now to the accompanying drawings and initially to FIGS. 1 and 2, an opening roller, identified as a whole by 1, is represented and rotates in an opening roller housing, not shown, in a manner which is basically known in connection with open-end spinning devices. It is the function of the opening roller to open a sliver, which has been supplied to it by means of a feed roller, into individual fibers. Subsequently the individual fibers are fed through a fiber inlet conduit to a spinning member, for example a spinning rotor. During the spinning process, such opening rollers usually operate at speeds between 6,000 and 12,000 rpm.

The opening roller 1 has a bearing shaft 2, on whose rear end a so-called drive wharve 3 is fixed in place. In a known manner, the drive wharve 3 is driven frictionally by a tangential belt (not represented) during the spinning operation. The bearing shaft 2 is rotatably seated by means of a roller bearing 4 inside a bearing housing 5. In turn, the bearing housing 5 is seated in a bearing bracket (not represented) of an opening roller housing and is fixed in place by means of a securing element which is tangentially passed through the plastic ring 6.

A roller body 7 is arranged on the front end of the bearing shaft 2. In this embodiment, the roller body 7 is connected with the bearing shaft 2 by means of a force fit to be fixed against relative rotation. The roller body 7 has a cylindrical shape and has a flange 8 on the rearward side. In this embodiment, the surface of the roller body 7 is preferably smooth. The roller body 1 has a further flange 11 at its forward end, which is connected with the bearing shaft 2, for example by means of a threaded bolt 12 and a compression spring 13.

A sawtooth card clothing can either be directly fastened on the surface of the cylindrical roller body 7, as indicated by the clothing 10' in FIG. 2, or indirectly fastened thereon via mounting on a support element 19, as indicated by the clothing 10 in FIG. 1. In the assembled state in each embodiment, the front flange 11 fixes the sawtooth card clothing 10, 10', in place on the roller body 7. In each case, the sawtooth card clothing 10, 10', has a base body 15 in the shape of a spiral spring, which can have different embodiments in cross-section.

FIG. 1 represents a sawtooth card clothing 10, which has been inserted with the spiral windings of its base body 15 into a helically extending groove 9 of the support element 19. In this case, the base body 15 has an approximately square cross-sectional shape A, or A', as indicated respectively in FIGS. 4a and 4b. In the cross-sectional shape A (FIG. 4a), the base body 15 is frictionally fixed in place in the groove 9, i.e., by pressure between the land 22 extending between the successive turns of the grooves 9 of the support element 19 and the sawtooth card clothing 10, the land 22 is forced between the flanks of the base body 15 whereby the base body is received within the groove 9 in a secure friction fit. In a slightly modified embodiment (FIG. 4b), a recess 21 is formed in the area of the base body 15 of the sawtooth card clothing 10. The material of the support element 19 is pressed into this recess 21 when the land 22 of the support element 19 enters between the flanks of the base body 15, resulting in an interlocking connection.

As indicated in FIG. 5, the cross-section A" of the base body 15 can also have a shape by means of which the successive windings of the base body 15 are engaged with each other and in this manner fix each other in place, as can be seen from FIG. 2. A sawtooth card clothing designed in this manner is shown in a perspective view in FIG. 3 and, as seen in FIG. 2, may be directly pushed on the roller body 7 of the opening roller 1.

In this embodiment, the opposite ends 17 of the sawtooth card clothing 10' can be fixed in place on the flanges 8, and 11, by means of corresponding arresting shoulders 18, which project from the ends of the card clothing 17 and engage in recesses in the flanges 8 and 11. In this way, the opposite ends 17 of the sawtooth card clothing 10' are prevented from spreading outwardly under the effect of centrifugal force during operation, i.e. when the opening roller 1 rotates at high rpm.

As is also known from the prior art, the helical spring-like sawtooth card clothing 10, or 10', made of a commercial ceramic material, have a plurality of willowing elements 16, which respectively project radially away from the base body 15.

An oxide, a carbide, a nitride or a boride may be utilized as the structural material, wherein among others aluminum oxide has been shown to be very well suited. For example, aluminum oxide has a broad application potential, and is advantageous as a mixed ceramic material, for example in combination with zirconium oxide. Such a mixed ceramic material results in a wear-resistant structure, which in addition has a relatively good flexural strength.

However, it is also easily possible to produce the sawtooth card clothing 10, 10' from another ceramic material, for example silicon carbide and silicon nitride. These ceramic materials are also distinguished by an abrasion resistance which is clearly higher than that of hardened steel.

In a manner customary in connection with ceramic materials, the manufacture of the helical spring-like sawtooth card clothing of the invention takes place in special molds, into which the ceramic material is placed initially in the form of a powder.

The appropriate mold can be filled in accordance with various pressing and molding methods. In the production of ceramic components of complex shape, such as the sawtooth card clothing of the present invention, so-called injection molding or transfer molding is customary, among other techniques. In this case a ceramic powder with a relatively high plastification portion is required for filling the mold, wherein this plastification portion is removed prior to the subsequent thermal baking. That is, for producing the sawtooth card clothing in accordance with the invention, a ceramic powder of the finest grains, for example $Si_3N_4$ powder which has been mixed with additives and auxiliary materials, is delivered, preferably by the use of pressure, into a mold whose size takes into consideration the inevitable shrinkage of the ceramic components during the manufacturing process.

The relatively delicate green compact created after drying and removal of the mold can thereafter be worked relatively easily. So-called calcining at white heat follows the green processing during which the auxiliary materials contained in the ceramic material are baked out. The so-called white stability is determined by this preburning. The so-called white blanks can also be worked relatively easily by means of conventional tools with relatively little tool wear. It is therefore intended to bring the sawtooth card clothing as closely as possible to its final dimensions by means of the original shaping as well as green and white working.

Thereafter, the components are sintered which, for example, takes place in a vacuum or under increased nitrogen pressure at temperatures between 1750° C. and 1950° C. Following sintering, the components can only be worked with diamond-tipped tools or ceramic working substances of extreme hardness.

What is claimed is:

1. An opening roller for an open-end spinning device, comprising a rotatably seated cylindrical roller body encircled by a sawtooth card clothing, the sawtooth card clothing consisting essentially of a ceramic material formed in a helical spring-like shape.

2. The opening roller in accordance with claim 1, wherein the ceramic material is an oxide.

3. The opening roller in accordance with claim 1, wherein the ceramic material is selected from the group of aluminum oxide and zirconium oxide.

4. The opening roller in accordance with claim 1, wherein the ceramic material is a carbide.

5. The opening roller in accordance with claim 1, wherein the ceramic material is silicon carbide.

6. The opening roller in accordance with claim 1, wherein the ceramic material is a nitride.

7. The opening roller in accordance with claim 1, wherein the ceramic material is silicon nitride.

8. The opening roller in accordance with claim 1, wherein the sawtooth card clothing comprises a mixture of ceramic materials.

9. The opening roller in accordance with claim 1, wherein the sawtooth card clothing comprises a mixture of aluminum oxide and zirconium oxide.

10. The opening roller in accordance with claim 1, wherein the sawtooth card clothing comprises a base body with radially projecting willowing elements, wherein the base body has an essentially square cross-section.

11. The opening roller in accordance with claim 1, wherein the sawtooth card clothing is positioned directly on the cylindrical roller body and comprises an arresting shoulder at each end.

12. The opening roller in accordance with claim 1, wherein the sawtooth card clothing is arranged on a support element having a helically extending groove about its circumference.

13. The opening roller in accordance with claim 12, wherein the sawtooth card clothing is interlockingly fixed in place on the support element.

14. The opening roller in accordance with claim 1, wherein the sawtooth card clothing has a recess in the area of its base body.

15. The opening roller in accordance with claim 12, wherein the sawtooth card clothing is frictionally fixed in place on the support element.

* * * * *